(12) United States Patent
Irie et al.

(10) Patent No.: US 6,435,736 B1
(45) Date of Patent: Aug. 20, 2002

(54) OPTICAL DEVICE AND METHOD FOR MANUFACTURING THE SAME

(75) Inventors: Yuichiro Irie; Jun Miyokawa; Takeo Shimizu, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/621,361

(22) Filed: Jul. 21, 2000

(30) Foreign Application Priority Data

Jul. 23, 1999 (JP) .......................................... 11-209164

(51) Int. Cl.⁷ ............................................... C02B 6/36
(52) U.S. Cl. ........................................... 385/92; 385/88
(58) Field of Search ............................... 385/88–94, 49; 359/152

(56) References Cited

U.S. PATENT DOCUMENTS

| 4,687,290 A | * | 8/1987 | Prussas ......................... 385/88 |
| 4,865,410 A | * | 9/1989 | Estrada et al. ................. 385/92 |
| 4,997,243 A | * | 3/1991 | Aiki et al. ..................... 385/92 |
| 5,854,869 A | * | 12/1998 | Joyce ........................... 385/92 |
| 5,963,695 A | * | 10/1999 | Joyce ........................... 385/88 |

* cited by examiner

*Primary Examiner*—Hemang Sanghavi
*Assistant Examiner*—Scott A Knauss
(74) *Attorney, Agent, or Firm*—Oblon, Spivak, McClelland, Maier & Neustadt, P.C.

(57) ABSTRACT

The invention relates to an optical device, having high reliability, which is free from any breakage of optical fibers in line with changes in temperature. A laser diode element 1 is disposed in a metal-made package 9, the tip end side of a lensed fiber 2 having a lens 3 formed at the tip end side of the optical fiber is inserted into and fixed at the first ferrule 5, and the first ferrule 5 is fixed on the base 10. The second ferrule 6 is provided at the rear end side of the first ferrule 5 via a spacing, and is inserted into and fixed in the insertion portion 20 of the package 9. And, an intermediate portion of the lensed fiber 2 is inserted into and fixed at the second ferrule 6. A deflection 14 is provided at the lensed fiber 2 between the first ferrule 5 and the second ferrule 6, shown in FIG. 1A, at a temperature lower than the upper limit of the environmental temperature for use. The deflection 14 is used as a means for preventing a tensile strain exceeding the allowable range from being applied to the lensed fiber 2 between the first ferrule 5 and the second ferrule 6 at the upper limit of the environmental temperature for use.

7 Claims, 4 Drawing Sheets

OPTICAL DEVICE AND METHOD FOR MANUFACTURING THE SAME

FIELD OF THE INVENTION

The present invention relates to an optical device such as a laser diode module used for optical transmissions, and a method for manufacturing the same.

BACKGROUND OF THE INVENTION

Figure 4A:
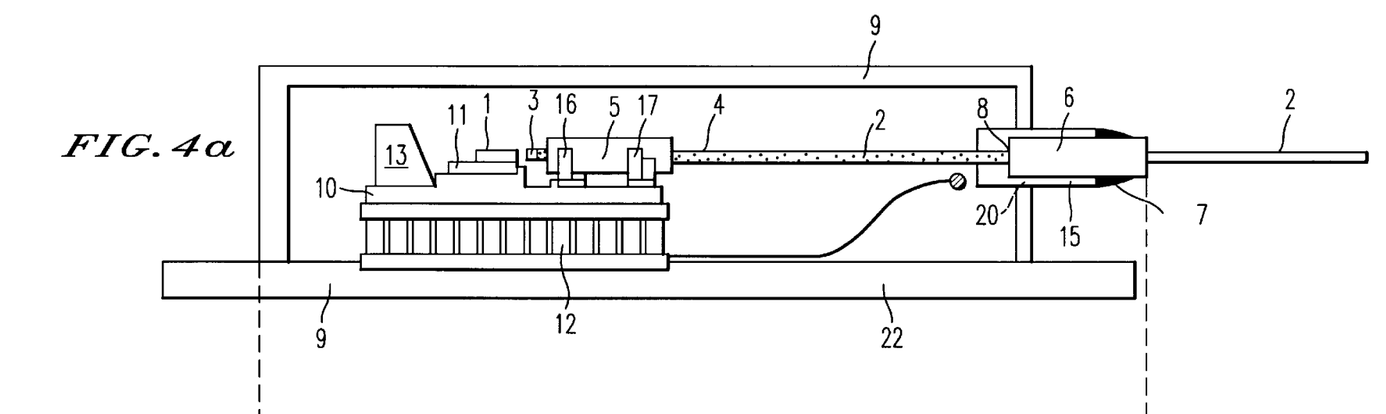
FIG. 4A is an explanatory view of the major parts, showing a state, at 25° C., of one example of a prior art laser diode module.
Figure 4B:
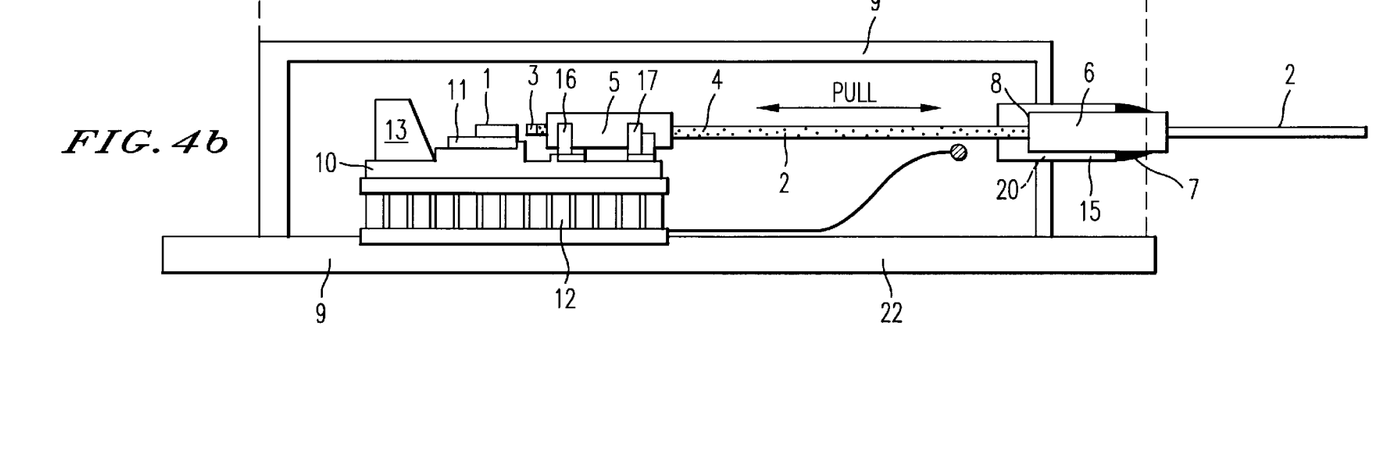
FIG. 4B is an explanatory view of the major parts, showing a state of the laser diode module at the upper limit of the environmental temperature for use.

Conventionally, a laser diode module has been used for optical transmissions. The laser diode module is such that a laser diode (LD) element for transmitting light and optical fibers for propagating light from the laser diode element are optically coupled in advance, and these are composed as a module. FIG. 4A and FIG. 4B show one example of a laser diode module in a sectional view.

The laser diode module shown in the same drawings has a metal-made package 9. A laser diode element 1 is disposed and fixed at the fixing portion of a base 10 fixed in the package 9 via a heat sink 11. Also, the tip end side of a lensed fiber 2 having a lens 3 formed at the tip end side of the optical fiber is inserted from an insertion portion 20 secured at the sidewall of the package 9 into the package 9. The tip end side (the attached portion of the lens 3) of the lensed fiber 2 is aligned with the light emitting portion of the laser diode element 1 and is opposed thereto. That is, the laser diode element 1 and lensed fiber 2 are opposed to each other and disposed so that the excitation efficiency (optical coupling efficiency) between the laser diode element 1 and the lensed fiber 2 is maximized.

Also, the package 9 is such that, for example, the bottom plate 22 thereof is made of CuW, and the other portions thereof are made of an Fe—Ni—Co based alloy represented by KOVAL (Trade name).

The first ferrule 5 is fixed on the base 10 via ferrule retaining portion 16 and 17, and the tip end side of the lensed fiber 2 is inserted into and fixed at the first ferrule 5, and the second ferrule 6 is provided at the rear end side of the first ferrule 5 with a spacing, wherein the intermediate portion of the lensed fiber 2 is inserted into and fixed at the second ferrule 6. The second ferrule 6 is inserted into the insertion portion 20 of the package 9. The second ferrule 6 is fixed at the sidewall of the package 9 via a ferrule fitting portion 15 provided at the package 9.

Metal is plated on the surface of the lensed fiber 2 between the first ferrule 5 and the second ferrule 6. One end side of the metal plated portion 4 is fixed at the second ferrule 6 by soldering 8, and the second ferrule 6 is fixed at the ferrule fitting portion 15 by soldering 7. By the metal plate portion 4 of the lensed fiber 2 being fixed at the second ferrule 6 by soldering and the second ferrule 6 being fixed at the ferrule fitting portion 15 by soldering, the package 9 can be kept hermetic.

The first ferrule 5 is fixed at the ferrule retaining portions 16 and 17 by, for example, YAG laser welding, etc. Also, a monitor photo diode 13 is fixed on the base 10, and a Peltier element module 12 is fixed at the lower side of the base 10. The Peltier module 12 is provided with a Peltier element to keep the temperature of the laser diode element 1 at a fixed level.

As described above, if the laser diode module is constructed by using such a lensed fiber 2, there is an advantage in that the composition of parts can be simplified to reduce production costs. Also, by optimizing the shape of the lens 3 of the lensed fiber 2, the laser diode module having the abovementioned lensed fiber 2 can increase the optical coupling efficiency between the lensed fiber 2 and the laser diode element 2 remarkably. Thus, a laser diode module having very high optical coupling efficiency, which is provided with a lensed fiber 2, is an excellent laser diode module.

Further, in a prior art laser diode module thus constructed, as shown in FIG. 4A, the laser diode module is formed so that no deflection arises in the lensed fiber 2 between the first ferrule 5 and the second ferrule 6 at a temperature (for example, 25° C.) for producing the laser diode module.

OBJECTS AND SUMMARY OF THE INVENTION

In order to secure reliability of a laser diode module, at an environmental temperature where the laser diode module is used, it is desirable that no breakage, etc., of the lensed fiber 2 occurs. At present, the temperature at which the laser diode module is used is generally from 0° C. through 75° C. Also, taking various climatic conditions into consideration, the environmental temperature at which the laser diode module is kept in custody will become −40° C. through 85° C. Therefore, the environmental temperature at which the laser diode module is used will be from −40° C. through 85° C. In this temperature range, a laser diode module having no breakage or interruption of the lensed fiber 2 is requested.

However, since a metal-made package 9 has a larger thermal expansion coefficient than a lensed fiber 2 made of a glass-based material, it is liable to expand due to heat. Accordingly, as the environmental temperature for use rises, the distance between the first ferrule 5 and the second ferrule 6 varies and increases. And, as the environmental temperature where the laser diode module is used becomes higher than the production temperature, the distance between the first ferrule 5 and the second ferrule 6 becomes large as shown in FIG. 4B. On the other hand, the thermal expansion coefficient of the lensed fiber 2 is very slight in comparison with that of the package 9, and it hardly changes due to changes in the abovementioned environmental temperature for use. Therefore, a tensile stress is applied to the lensed fiber 2 fixed between the first ferrule 5 and the second ferrule 6.

Further, as described above, since an optical fiber such as a lensed fiber 2 is made of a glass-based material, and is very weak to tensile stress, in prior art laser diode modules, a problem such as breakage arises in the lensed fiber 2 due to a tensile stress applied onto the lensed fiber 2 in high temperatures. Further, instead of breakage of the lensed fiber 2, such trouble occurs, in which the lensed fiber 2 is separated from the first ferrule 5 or the second ferrule 6 at the fixing portion. Such breakage of the lensed fiber 2 or the problem of separation at the fixing portion may damage the reliability of a laser diode module, and these were critical problems.

The present invention was developed in order to solve such problems in the prior arts, and it is therefore an object of the invention to provide an optical device such as a laser diode module, having high reliability, in which no break occurs in an optical fiber at an environmental temperature for use, and optical fibers are not separated from the ferrules at the fixing portion, and a method for producing the same.

In order to achieve the abovementioned object, the present invention employs the following construction as the means for solving the problems. That is, an optical device according to the first aspect of the invention is featured in that the first ferrule in which an optical fiber is inserted and fixed is fixed in a package formed of a material having a larger thermal expansion coefficient than that of the optical fiber, the second ferrule in which the optical fiber is inserted and fixed is fixed in the package at a position spaced from the first ferrule in the lengthwise direction of the optical fiber, and the distance between the first ferrule and the second ferrule varies and increases as the environmental temperature for use of the optical device rises, wherein the optical device is provided with a tensile stress suppressing means which can prevent a tensile stress exceeding a specified allowable range from being applied to an optical fiber between the first ferrule and the second ferrule at the upper limit of the environmental temperature for use.

An optical device according to the second aspect of the invention is featured in that, in addition to the first aspect, a means for preventing the above tensile stress from being applied is based on a deflection formed in an optical fiber between the first ferrule and the second ferrule at a lower temperature than the upper limit of the environmental temperature for use.

Further, an optical device according to the third aspect of the invention is featured in that, in addition to the first aspect, a laser diode element is disposed and fixed at the fixing portion of the base fixed at the tip end side of an optical fiber, the tip end side of a lensed fiber on which a lens is formed at the tip end side of the optical fiber is inserted into a package through an insertion portion secured at the side wall of the package, the tip end side of the corresponding lensed fiber is aligned with a limit emitting portion of the laser diode element and is opposed thereto, the tip end side of the lensed fiber is inserted into and fixed in the first ferrule with the first ferrule fixed on the base, the second ferrule is secured at the rear end side of the corresponding first ferrule via a spacing, an intermediate portion of the lensed fiber is inserted into and fixed at the second ferrule, and the corresponding second ferrule is inserted into the insertion portion of the package and is fixed at the side wall of the package.

In addition, an optical device according to the fourth aspect of the invention is featured in that, in addition to the second aspect, a laser diode element is disposed and fixed at the fixing portion of the base fixed in the package, the tip end side of the lensed fiber in which a lens is formed at the tip end side of an optical fiber is inserted into a package through an insertion portion secured at the side wall of the package, the tip end side of the corresponding lensed fiber is aligned with the light emitting portion of the laser diode element and is opposed thereto, the tip end side of the lensed fiber is inserted into and fixed in the corresponding first ferrule with the first ferrule fixed on the base, the second ferrule is provided at the rear end side of the corresponding first ferrule via a spacing, an intermediate portion of the lensed fiber is inserted into and fixed at the corresponding second ferrule, and the corresponding second ferrule is inserted into the insertion portion of the package and is fixed at the sidewall of the package.

Still further, an optical device according to the fifth aspect of the invention is featured in that, in addition to the fourth aspect, the distance between the first ferrule and the second ferrule is set to 7.5 mm through 30 mm at 25° C., and an amount of deflection of a lensed fiber between the first ferrule and the second ferrule at 25° C. is set to 3 $\mu$m through 15 $\mu$m.

Further, a method for producing an optical device according to the sixth aspect of the invention is a method for producing an optical device constructed according to the third, fourth or fifth aspect of the invention and is featured in that, after the tip end side of a lensed fiber is inserted into and fixed at the first ferrule and fixed on a base, the second ferrule in which any intermediate portion of the lensed fiber is fixed is secured in a package so that no deflection is formed on the lensed fiber between the first ferrule and the second ferrule under a temperature condition defined in advance around the upper limit of the environmental temperature for use.

Furthermore, a method for producing an optical device according to the seventh aspect of the invention is featured in that, in addition to the sixth aspect, the temperature at which the second ferrule is fixed in a package is set to 80° C. through 110° C.

Still further, a method for producing an optical device according to the eighth aspect of the invention is a method for producing an optical device constructed according to the third, fourth, or fifth aspect, and is featured in that the second ferrule fixing temperature which is lower than the upper limit of the environmental temperature for use is determined, and an amount of deflection of an optical fiber is obtained at the second ferrule fixing temperature which can suppress or prevent a tensile stress exceeding the allowable range from being applied to the lensed fiber between the first and second ferrules at the upper limit of the environmental temperature for use, wherein after the tip end side of the lensed fiber is inserted into and fixed at the first ferrule and is fixed on the base, a deflection equivalent to the amount of deflection is formed on the lensed fiber between the first ferrule and the second ferrule under the second ferrule fixing temperature conditions, and in this state the second ferrule in which any intermediate portion of the lensed fiber is fixed is secured in the package.

In an optical device constructed in respective constructions of the invention, the first ferrule in which an optical fiber is inserted and fixed and the second ferrule in which an optical ferrule is inserted and fixed have a spacing in the lengthwise direction of the optical fiber. And, as the environmental temperature for use of an optical device is increased, the distance between the first ferrule and the second ferrule varies and increases. However, an optical device according to the invention is provided with a means for preventing a tensile stress exceeding the allowable range from being applied onto an optical fiber between the first ferrule and the second ferrule at the upper limit of the environmental temperature for use. Therefore, the optical device according to the invention can prevent a tensile stress exceeding the allowable range from being applied onto an optical fiber between the first ferrule and the second ferrule.

Accordingly, an optical device according to the invention can prevent an optical fiber between the first ferrule and the second ferrule from being broken or interrupted, and prevent the fixing portion between the optical fiber and the first or the second ferrule from being disconnected.

Also, the means for preventing a tensile stress from being applied can be easily formed by a deflection formed in an optical fiber between the first ferrule and the second ferrule at, for example, a lower temperature than the upper limit of the environmental temperature for use. Also, since a stress due to the deflection is further dispersed to the entirety of an optical fiber in comparison with a tensile stress, stress can be prevented from becoming concentrated at a specified place such as a fixing portion of an optical fiber in a ferrule. Accordingly, in an optical device according to the second aspect of the invention, in which the deflection is utilized as a means for preventing a tensile stress from being applied, there is no case where an optical fiber is broken due to the deflection and the optical fiber is disconnected from the ferrules.

Also, an optical device according to the second aspect of the invention, in which the deflection is utilized as the means for preventing a tensile stress from being applied, can simply prevent a tensile stress from being applied onto an optical fiber by using a very simple means, which is the deflection of the optical fiber, as the means for preventing a tensile stress from being applied. Also, in this construction, since it is very simple to change the amount of deflection of an optical fiber, it is possible to instantaneously deal with changes in design of packages.

Further, an optical device according to the third and fourth aspects of the invention is such that a laser diode element fixed at the fixing portion of the base fixed in a package is optically coupled with a lensed fiber, and the lensed fiber is inserted into and fixed at the first ferrule and the second ferrule via a spacing in the lengthwise direction of the optical fiber. By an optical device according to the third aspect and the fourth aspect of the invention, an optical device thus constructed can be made into an excellent optical fiber which brings about the excellent effects described above.

In addition, according to an optical device of the fifth aspect of the invention, in compliance with the specifications of the optical device according to the fourth aspect, it becomes possible to accurately control the distance between the first ferrule and the second ferrule, and the amount of deflection at 25° C. Therefore, the fifth aspect of the invention can securely prevent a tensile force exceeding the allowable range from being applied onto an optical fiber between the first ferrule and the second ferrule in an optical device such as a laser diode module in which the upper limit of the environmental temperature for use is approximately 85° C.

Further, with a method for producing an optical device according to each of the constructions of the invention, the amount of deflection of an lensed fiber between the first ferrule and the second ferrule can be accurately controlled, whereby it is possible to produce an optical device which can bring about the abovementioned excellent effects.

BRIEF DESCRIPTION OF THE DRAWINGS

Exemplary embodiments of the invention will now be described in conjunction with the drawings in which.

DETAILED DESCRIPTION OF THE PREFERRED EMBODIMENTS

Figure 1A:
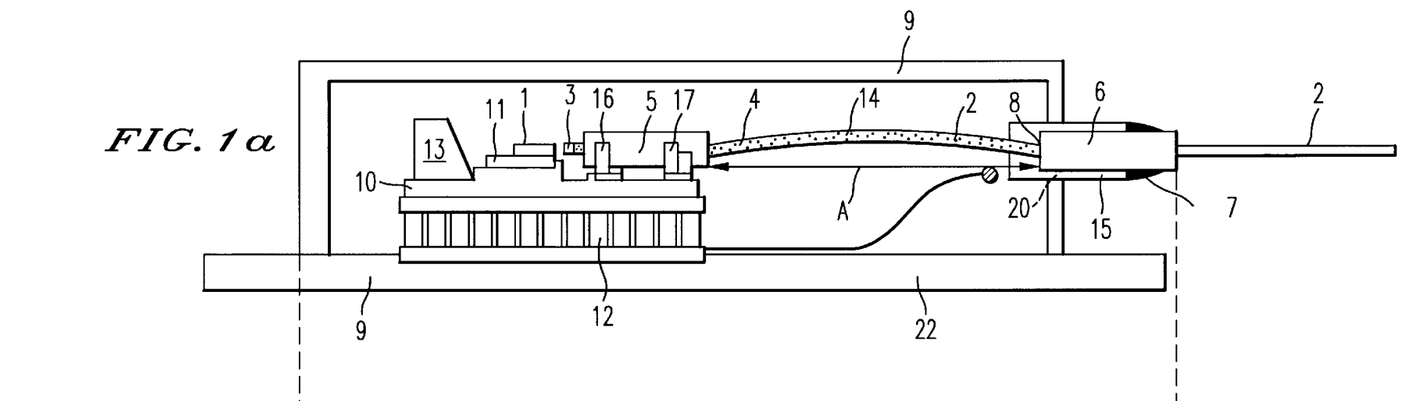
FIG. 1A is an explanatory view showing, at 25° C., the major parts of one embodiment of an optical device according to the invention.
Figure 1B:
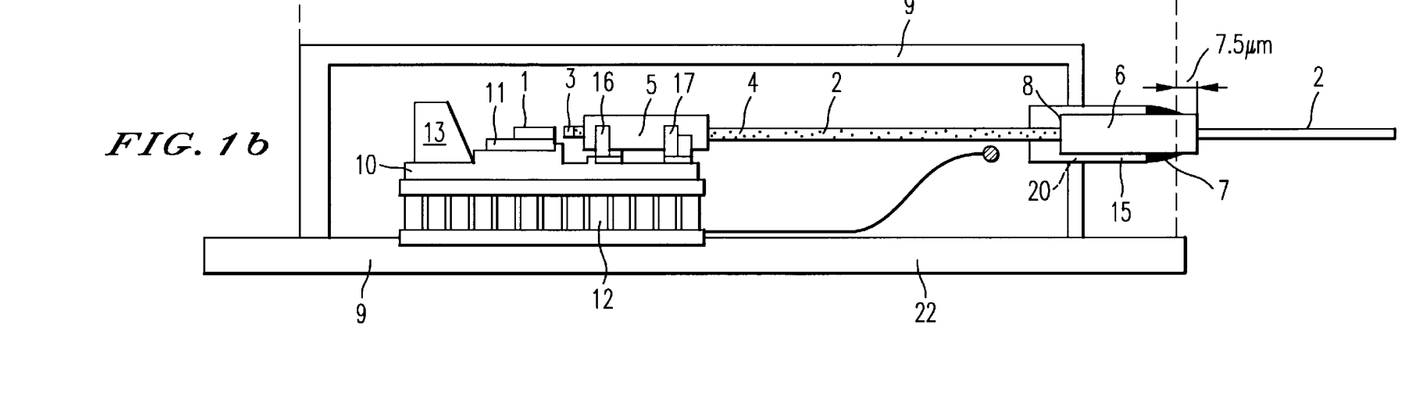
FIG. 1B is an explanatory view of the major parts, showing a state of the optical device at the upper limit of the environmental temperature for use.

Hereinafter, a description is given of preferred embodiments of the invention with reference to the accompanying drawings. Also, in the description of the embodiments, parts which have the same names as those in the prior art examples are given the same reference numbers, and overlapping description thereof is omitted. In FIG. 1A and FIG. 1B, one embodiment of an optical device according to the invention is illustrated in a longitudinal section view.

An optical device of the embodiment is a laser diode module. The preferred embodiment is constructed as in the prior art example. In the embodiment, a characteristic point differing from the prior art example exists in that a means for preventing a tensile stress from being applied is provided, which can prevent a tensile stress exceeding the allowable range from being applied onto a lensed fiber 2 between the first ferrule 5 and the second ferrule 6 at the upper limit of the environmental temperature where the laser diode module is used.

As shown in FIG. 1A, in a laser diode module of the embodiment, deflection 14 is formed at the lensed fiber 2 between the first ferrule 5 and the second ferrule 6 at a lower temperature (for example, 25° C.) than the upper limit (85° C.) of the environmental temperature for use (for example, −40° C. through 85° C.). In the embodiment, the deflection 14 is constituted as the means for preventing a tensile stress from being applied.

As shown in FIG. 1A, the distance ("A" in the drawing) between the first ferrule 5 and the second ferrule 6 is 15 mm at 25° C., and the amount of deflection of the lensed fiber 2 between the first ferrule 5 and the second ferrule 6 is 7.5 $\mu$m at 25° C. In other words, the length of the lensed fiber 2 between the first ferrule 5 and the second ferrule 6 is 15 mm+7.5 $\mu$m, whereby the lensed fiber having such a length is deflected.

The laser diode module according to the embodiment is produced as shown below. That is, first, a laser diode element 1 is fixed on the base 10 of the package 9 via a heat sink 11, and the first ferrule 5 in which the tip end side of the lensed fiber 2 is inserted and fixed is fixed by means of the ferrule retaining portions 16 and 17. Also, at this time, the lensed fiber 2 is aligned with the laser diode 1 and fixed thereat, so that the optical coupling ratio between the laser diode element 1 and the lensed fiber 2 is maximized.

Next, as shown in FIG. 1B, the second ferrule 6 in which an intermediate portion of the lensed fiber 2 is fixed is secured in the package 9 so that no deflection is formed on the lensed fiber 2 between the first ferrule 5 and the second ferrule 6 at a predetermined temperature condition (for example, 10° C. through 80° C.) around the upper limit of the environmental temperature for use.

The intermediate portion of the lensed fiber 2 may be fixed at the second ferrule 6 at a predetermined temperature condition in the vicinity of the upper limit of the abovementioned environmental temperature for use or may be fixed at a lower temperature (for example, a room temperature) than this temperature. Also, it is preferable that a temperature at which solder used in various positions in a laser diode module does not melt is selected as the temperature condition. In a case where the abovementioned fixing is carried out at, for example, 80° C. through 110° C., it is preferable in that solder (meltable at a temperature of 120° C. or so) used at various positions in a laser diode module according to the preferred embodiment can be prevented from melting.

Also, the laser diode module may be produced as described below. That is, first, the second ferrule fixing temperature which is lower than the upper limit of the environmental temperature for use is determined in advance. And, an amount of deflection of the lensed fiber 2 at the second ferrule fixing temperature, at which a tensile stress exceeding the allowable range can be prevented from being applied onto the lensed fiber 2 between the first ferrule 5 and the second ferrule 6 at the upper limit of the environmental temperature for use, is obtained.

And, as described above, after the lensed fiber 2 is aligned with the laser diode element 1 and the first ferrule 5 is fixed on the base 10, deflection 14 having the amount of deflection thus obtained is formed in the lensed fiber 2 between the first ferrule and the second ferrule 6 under the second ferrule fixing temperature conditions. In this state, the second ferrule 6 in which an intermediate portion of the lensed fiber 2 is fixed is secured in the package 9, thereby producing a laser diode module.

When producing a laser diode module by using this production method, for example, the second ferrule fixing temperature is determined to be 25° C., and the first ferrule 5 is fixed on the base 10. Thereafter, deflection of 7.5 μm is formed on the lensed fiber 2 between the first ferrule 5 and the second ferrule 6 at 25° C., and the second ferrule 6 will be fixed in the package 9.

Also, the amount of deflection of the lensed fiber 2 between the first ferrule 5 and the second ferrule 6 at 25° C. can be obtained as described below.

The elongation of the package 9 of the laser diode module is maximized at the upper limit Tmax of the environmental temperature for use. Herein, the distance between the first ferrule 5 and the second ferrule 6 is set to L(Troom) and the linear expansion coefficient of the package is set to α where the distance between the first ferrule 5 and the second ferrule 6 at a temperature Tmax is L(Tmax), the room temperature is Troom, and the distance between the first ferrule 5 and the second ferrule 6 at room temperature Troom is L (Troom). If so, the elongation of the distance between the first ferrule 5 and the second ferrule 6 when the temperature changes from Troom to Tmax, that is, the elongation of a metallic package 9 having a length between the first ferrule 5 and the second ferrule 6 can be expressed by the following equation (1).

$$\Delta L = L(T\text{max}) - L(T\text{room}) = L(T\text{room}) \cdot \alpha \cdot (T\text{max} - T\text{room}) \quad (1)$$

Also, since the thermal expansion of the lensed fiber 2 made of a glass-based material is small enough to be ignored in comparison with the linear expansion of the metallic package 9, it can be assumed that the length of the lensed fiber 2 does not change, depending on the temperature, between Tmin to Tmax. Accordingly, it is satisfactory if the amount of deflection of the lensed fiber 2 between the first ferrule and the second ferrule 6 at room temperature Troom becomes ΔL or more.

For example, in the above expression, where Troom=25° C., Tmax=85° C., L(Troom) 15 mm, and α=8.3×10$^{-6}$/K, ΔL becomes equal to 7.5 μm (ΔL=7.5 μm). Further, in the preferred embodiment, the bottom plate 22 of the package 9 is made of a material differing from the materials of the other portions, and since CuW (herein, Cu is 20% by weight and W is 80% by weight) which forms the bottom plate 22 has a larger thermal expansion coefficient than that of KOVAL, the value of the above a was set to the thermal expansion coefficient of CuW.

On the other hand, the amount of deflection of the lensed fiber 2 between the first ferrule 5 and the second ferrule 6 is maximized at the lower limit Tmin of the environmental temperature where the laser diode module is used. If the amount of deflection at the lower limit Tmin of the environmental temperature where the laser diode module is used is too large, the bending radius of the optical fiber is made small, wherein bending strain due to the deflection adversely influences the characteristics of the lensed fiber 2. The adverse influence increases the optical loss of, for example, the lensed fiber 2, and continuation of the bending strain eve longer results in damage to the optical fibers.

Therefore, where the deflection of the lensed fiber 2 between the first ferule 5 and the second ferrule 6 at room temperature Troom is decided to be ΔL=7.5 μm, it is necessary that the bending strain due to the deflection at the lower limit Tmin of the environmental temperature where the laser diode module is used is devised so as not to adversely influence the characteristics of the lensed fiber 2.

Where the distance between the first ferrule 5 and the second ferrule 6 at the temperature Tmin is set to L(Tmin), the L(Tmin) is obtained by the following expression (2).

$$L(T\text{min}) = L(T\text{room}) - L(T\text{room}) \cdot \alpha \cdot (T\text{room} - T\text{min}) \quad (2)$$

Therefore, where the Tmin is −40° C., the L(Tmin) becomes 15 mm−8.1 μm.

Figure 2:
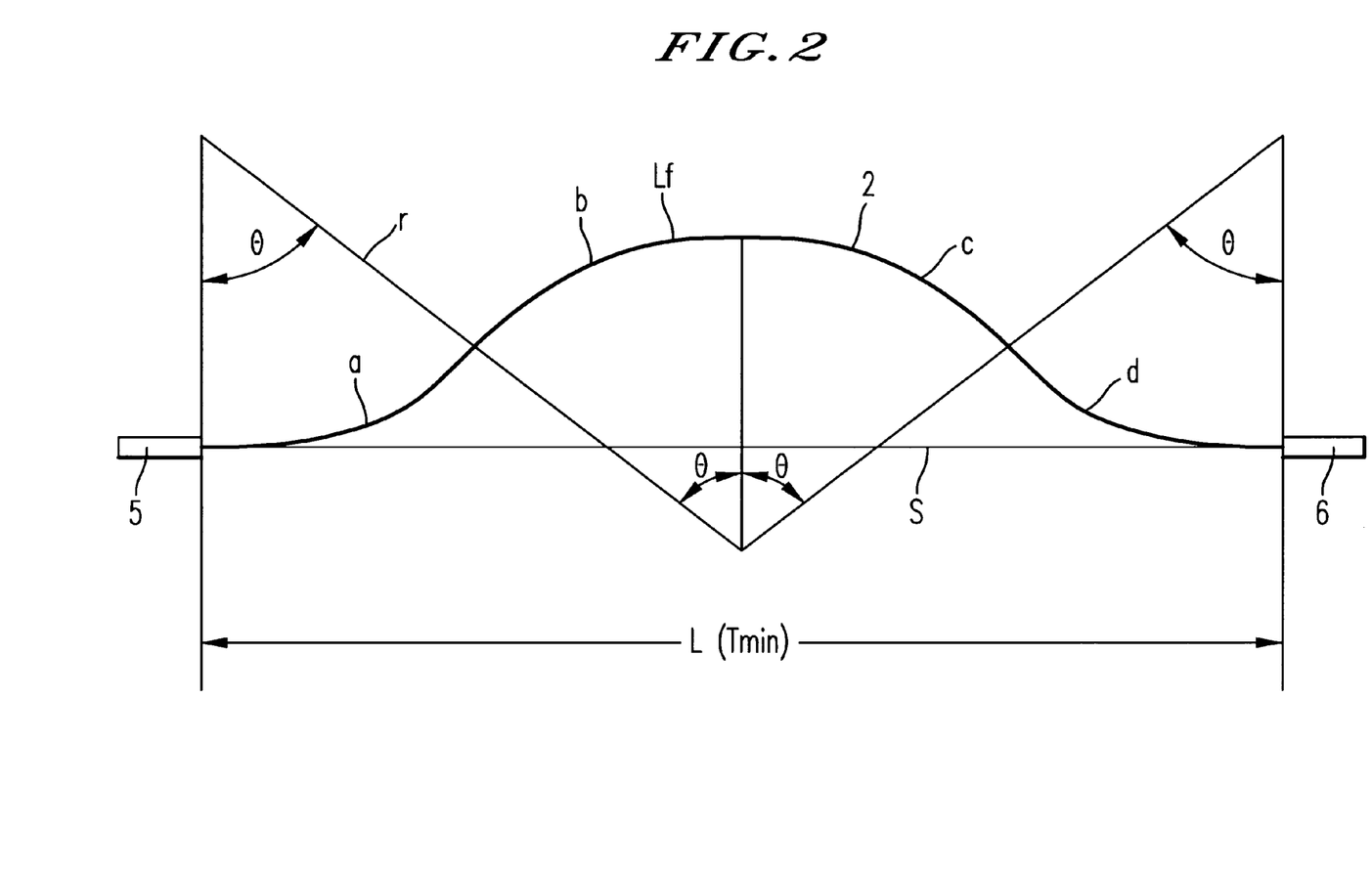
FIG. 2 is an explanatory view exemplarily showing a pattern of the bending strain of a lensed fiber at the lower limit value of the environmental temperature for use in the abovementioned embodiment.

Also, the state of deflection of the lensed fiber 2 between the first ferrule 5 and the second ferrule 6 becomes as illustrated in an exemplary view of FIG. 2. That is, in the vicinity of the insertion and fixing portion of the lensed fiber 2 in the first ferrule 5 and the insertion and fixing portion of the lensed fiber 2 into the second ferrule 6, the lensed fiber 2 comes to run along a straight line S connecting the first ferrule 5 to the second ferrule 6. On the other hand, in the vicinity of the center portion between the first ferrule 5 and the second ferrule 6, the lensed fiber 2 deviates greatly from the straight line S.

Herein, the length of the lensed fiber 2 between the first ferrule 5 and the second ferrule 5 is divided into four equal divisions which are named as "a", "b", "c" and "d", wherein the respective divisions a, b, c, and d become circular arcs whose center angle is θ, and radius is r.

Therefore, where the length of the lensed fiber 2 between the first ferrule 5 and the second ferrule 6 is determined to be Lf, the following expressions (3) and (4) are obtained.

$$4r\theta = Lf \quad (3)$$

$$4r \sin\theta = L(T\text{min}) \quad (4)$$

Also, based on the examination made by the present inventor, it is found that the bending strain applied onto an optical fiber by deflection becomes 0.2% or less by making the bending radius r of the optical fiber (lensed fiber 2) larger than 30 mm, and the reliability of the optical fiber can be secured. Therefore, if an attempt of the bending radius r of the optical fiber, which is obtained by the above expressions (3) and (4) is made to make larger than 30mm, the reliability of the lensed fiber 2 can be secured.

As described above, in the above preferred embodiment, the distance between the first ferrule 5 and the second ferrule 6 at 25° C. is 15 mm and the amount of deflection ΔL thereof is 7.5 μm, and the length Lf of the lensed fiber 2 between the first ferrule 5 and the second ferrule 6 is 15 mm+7.5 μm. Since the L(Tmin) is 15 mm−8.1 μm as described above, r=47 mm is established from the above expressions (3) and (4). The value is within the range where the bending strain applied onto the lensed fiber 2 by the deflection can secure the reliability of the optical fiber. Therefore, in the preferred embodiment, even though the bending strain which is maximized at Tmin is applied onto an optical fiber, the reliability of the optical fiber can be secured.

Therefore, in the abovementioned embodiment, as described above, the distance between the first ferrule 5 and the second ferrule 6 at 25° C. was established so as to become 15 mm, and the amount of deflection of the lensed fiber 2 between the first ferrule 5 and the second ferrule 6 at 25° C. was established so as to become 7.5 µm.

As described above, in the embodiment, as the environmental temperature increases where the laser diode module is used, the distance between the first ferrule 5 and the second ferrule 6 changes and increases. Therefore, in the embodiment, at a temperature lower than the upper limit of the environmental temperature for use, for example, as shown in FIG. 1A, the deflection 14 was formed at the lensed fiber 2 between the first ferrule 5 and the second ferrule 6. And, the deflection 14 is used as a means for preventing a tensile stress exceeding the allowable range from being applied onto the lensed fiber 2 between the first ferrule 5 and the second ferrule 6 at the upper limit of the environmental temperature for use.

For this reason, according to the preferred embodiment, application of a tensile stress exceeding the allowable range onto the lensed fiber 2 between the first ferrule 5 and the second ferrule 6 in the environmental temperature for use can be prevented by the deflection 14.

Therefore, according to the embodiment, it is possible to prevent breakage of the lensed fiber 2 between the first ferrule 5 and the second ferrule 6 from occurring due to the tensile stress, and prevent the fixing portion between the lensed fiber 2 and the first ferrule 5 or the second ferrule 6 from slipping off.

Also, in the embodiment, by using a very simple means, which is the deflection of an optical fiber, as a means for preventing a tensile stress from being applied, it is possible to simply prevent a tensile stress from being applied onto an optical fiber. In addition, since the amount of deflection of the optical fiber can be very simply varied, the preferred embodiment can instantaneously deal with a change in design of the package.

In addition, in the embodiment, although, at a lower temperature than the upper limit of the environmental temperature for use, a deflection 14 is formed on the lensed fiber 2 between the first ferrule 5 and the second ferrule 6, the stress resulting from the deflection 14 is dispersed to the entirety of the lensed fiber 2 in comparison with the tensile stress. Therefore, stress due to the abovementioned deflection 14 can be suppressed and prevented from becoming concentrated at a specified position such as a fixing portion of the lensed fiber 2 in the first ferrule 5 and the second ferrule 6. Therefore, in the preferred embodiment, even though the deflection 14 is continued for longer, no breakage occurs in the lensed fiber 2 and no slippage occurs at the fixing portion between the lensed fiber 2 and the first ferrule 5 or the second ferrule 6, whereby it is possible to construct a laser diode module having high reliability.

Also, in the laser diode module of the embodiment, the maximum deflection 14 occurs in the lensed fiber 2 between the first ferrule 5 and the second ferrule 6 at the lower limit of the environmental temperature for use. However, as described above, the bending radius r of the lensed fiber 2 between the first ferrule 5 and the second ferrule 6 does not decrease to such a value where the reliability of the lensed fiber 2 may be lost, even in a state where the maximum deflection 14 occurs.

Therefore, the embodiment can prevent the reliability of the characteristics of the lensed fiber 2 from being spoiled due to the bending strain resulting from the deflection 14, wherein the reliability of the lensed fiber 2 can be secured.

Based on the above description, according to the embodiment, no breakage occurs in the lensed fiber 2 in the environmental temperature for use, and no slippage occurs in the fixing portion between the lensed fiber 2 and the first ferrule 5 or the second ferrule 6. Furthermore, the embodiment will not damage the reliability of the characteristics of the lensed fiber 2 due to the bending strain resulting from the deflection 14 of the lensed fiber 2, whereby a laser diode module having high reliability can be secured.

In addition, the invention is not limited to the abovementioned embodiment, but may be subjected to various modifications in embodiment. For example, in the abovementioned embodiment, the distance between the first ferrule 5 and the second ferrule 6 at 25° C. was established at 15 mm, and the amount of deflection of the lensed fiber 2 between the first ferrule 5 and the second ferrule 6 at 25° C. was established at 7.5 µm. But, the distance between the first ferrule 5 and the second ferrule 6 and the amount of deflection of the lensed fiber 2 between the first ferrule 5 and the second ferrule 6 are not particularly limited, but these may be adequately established.

That is, the distance between the first ferrule 5 and the second ferrule 6 may be adequately established in compliance with the specifications of optical devices such as a laser diode module, etc.

Also, the amount of deflection of the lensed fiber 2 between the first ferrule 5 and the second ferrule 6 may be adequately established. An adequate amount of the amount of deflection can prevent a tensile stress exceeding the allowable range from being applied onto the lensed fiber 2 between the first ferrule 5 and the second ferrule 6 at the upper limit of the environmental temperature for use of an optical device, and is a value by which the reliability of the characteristics of the lensed fiber 2 may not be damaged. For example, in a laser diode module in which the distance between the first ferrule 5 and the second ferrule 6 at 25° C is 7.5 mm through 30 mm, it is preferable that the amount of deflection of the lensed fiber 2 between the first ferrule 5 and the second ferrule 6 at 25° C. is set to 3 µm through 15 µm.

Also, in the abovementioned embodiment, although the invention is applied to a laser diode module, the application thereof is not limited to the laser diode module, but it may be applicable to various optical devices. That is, an optical device to which the present invention is applied is an optical device having such a construction by which the distance between the first ferrule 5 and the second ferrule 6 described below varies in the increasing direction as the environmental temperature where the optical device is used rises. That is, the first ferrule of an optical device to which the invention is applied is fixed in a package, into and at which an optical fiber is inserted and fixed, made of a material having a larger thermal expansion coefficient than that of the corresponding optical fiber. Also, the second ferrule of an optical device to which the invention is applied is fixed in the abovementioned package into and at which the optical fiber is inserted and fixed, at a position with a spacing secured between it and the first ferrule in the lengthwise direction of the optical fiber.

Figure 3:
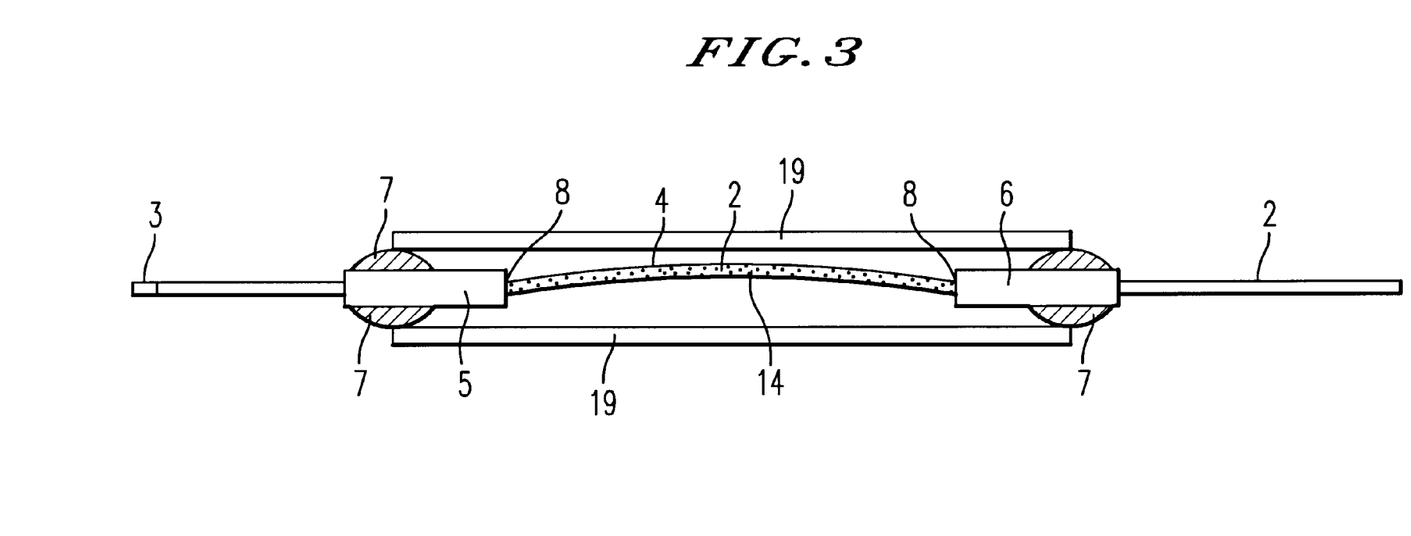
FIG. 3 is an exemplary view showing another embodiment of an optical device according to the invention.

FIG. 3 shows one example of the abovementioned optical devices. The optical device is such that one end side of a lensed fiber 2 is inserted into and fixed at the first ferrule, and the lensed fiber 2 is inserted into and fixed in the second ferrule 6 at a position with a spacing secured between it and the first ferrule 5 in the lengthwise direction. The first ferrule 5 is fixed by solder 7 at one end side of a cylindrical metal-made package 19. The second ferrule 6 is fixed at the other end side of the package 19. Also, in FIG. 3, 8 indicates solder, and 4 indicates a metal-plated portion.

In such an optical device, for example, a deflection 14 is formed at the lensed fiber 2 between the first ferrule 5 and the second ferrule 6 at a lower.temperature than the upper limit of the environmental temperature where, for example, an optical device is used, the deflection 14 is used as a means for preventing a tensile stress from being applied. Since, in the optical device illustrated in FIG. 3, a means for preventing a tensile stress from being applied is formed, as in the abovementioned embodiment, it is possible to prevent breakage of the lensed fiber 2 from occurring at the environmental temperature for use, and the fixing portion between the lensed fiber 2 and the first ferrule 5 or the second ferrule 6 from slipping. Also, by forming a means for preventing a tensile stress from being applied as in the abovementioned embodiment, the optical device shown in FIG. 3 can be constituted as an optical device having high reliability without damaging the reliability of the characteristics of the lensed fiber 2 by the deflection 14 of the lensed fiber 2 as in the abovementioned embodiment.

In addition, in the optical device shown in FIG. 3, the tip end side of the lensed fiber 2 is inserted into and fixed at the first ferrule 5, wherein the optical device may be used as a lensed fiber module. And, the lensed fiber module is constructed so that the lensed fiber module is applied to the laser diode module as shown in FIG. 1A and FIG. 1B, the tip end side of the lensed fiber module is fixed on the base 10, and the insertion portion of the second ferrule 6 is fixed in the insertion portion 20 of the package 9. If so, since it is possible to produce a laser diode module with the first ferrule 5 and the second ferrule 6 fixed in the package 9 in advance, it becomes easier to produce the laser diode module.

Further, in an optical device according to the invention, an optical fiber inserted into and fixed in the first ferrule and the second ferrule is not necessarily a lensed fiber 2. It may be an optical fiber other than the lensed fiber 2.

Still further, grating is written on the lensed fiber 2 in the embodiment, and an external resonator may be formed with respect to the laser diode element 1. With this construction, where a laser beam is emitted, since no excessive tensile force is applied onto the lensed fiber in the environmental temperature for use, the refractive index of the lensed fiber 2 and interval of the grating are not greatly changed. Therefore, by the construction, such an effect can be brought about, by which the oscillation wavelength of the laser beam will not slip greatly.

What is claimed is:

1. An optical device, in which a first ferrule in which an optical fiber is inserted and fixed is fixed in a package formed of a material having a thermal expansion coefficient, α, larger than that of the optical fiber, a second ferrule in which said optical fiber is inserted and fixed is fixed in the package at a position spaced from the first ferrule in the lengthwise direction of the optical fiber, and the distance between the first ferrule and said second ferrule varies and increases as the environmental temperature where the optical device is used rises; wherein the optical device is provided with a tensile stress suppressing means which can prevent a tensile stress exceeding a specified allowable range from being applied onto an optical fiber between said first ferrule and said second ferrule at the upper limit of said environmental temperature, Tmax, for use, and the tensile stress suppressing means includes a deflection, $\Delta L$, of the optical fiber between the first and second ferrules, the deflection $\Delta L$ being at least equal to $$L(Tmax)-L(Troom)\cdot\alpha\cdot(Tmax-Troom),$$

where L(Tmax) is a distance between the first and second ferrules at Tmax, and L(Troom) is a distance between the first and second ferrules at room temperature Troom, and a distance, L(Tmin), between the first and second ferrules at a lower limit of the environmental temperature, Tmin, is determined by $$L(Tmin)=L(Troom)-L(Troom)\cdot\alpha\cdot(Troom-Tmin).$$

2. An optical device as set forth in claim 1, wherein a laser diode element is disposed and fixed at a fixing portion of a tip end side of an optical fiber, the tip end side of a lensed fiber on which a lens is formed at the tip end side of the optical fiber is inserted into a package through an insertion portion secured at a side wall of the package, the tip end side of the corresponding lensed fiber is aligned with a light emitting portion of the laser diode element and is opposed thereto, the tip end side of the lensed fiber is inserted into and fixed in said first ferrule with said first ferrule fixed on the base, said second ferrule is secured at the rear end side of said first ferrule via a spacing, an intermediate portion of said lensed fiber is inserted into and fixed at said second ferrule, and said second ferrule is inserted into the insertion portion of the package and is fixed at the side wall of the package.

3. An optical device as set forth in claim 1, wherein a laser diode element is disposed and fixed at a fixing portion of a base fixed in the package, a tip end side of a lensed fiber in which a lens is formed at the tip end side of an optical fiber is inserted into a package through an insertion portion secured at a side wall of said package, the tip end side of said lensed fiber is aligned with the light emitting portion of the laser diode element and is opposed thereto, the tip end side of the lensed fiber is inserted into and fixed in said first ferrule with said first ferrule fixed on the base, said second ferrule is provided at the rear end side of said first ferrule via a spacing, an intermediate portion of said lensed fiber is inserted into and fixed at said second ferrule, and said second ferrule is inserted into the insertion portion of said package and is fixed at the sidewall of said package.

4. An optical device as set forth in claim 3, wherein the distance between said first ferrule and said second ferrule is set to 7.5 mm through 30 mm at 25° C., and the amount of deflection of a lensed fiber between said first ferrule and said second ferrule at 25° C. is set to 3 $\mu$m through 15 $\mu$m.

5. A method for producing an optical device as set forth in claim 2, 3 or 4, wherein, after the tip end side of a lensed fiber is inserted into and fixed at said first ferrule and fixed on a base, said second ferrule in which any intermediate portion of said lensed fiber is fixed is secured in a package so that no deflection is formed on said lensed fiber between said first ferrule and said second ferrule under a temperature condition defined in advance around the upper limit of the environmental temperature for use.

6. A method for producing an optical device as set forth in claim 5, wherein the temperature at which said second ferrule is fixed in a package is set to 80° C. through 110° C.

7. A method for producing an optical device as set forth in claim 2, 3 or 4, wherein said second ferrule fixing temperature which is lower than the upper limit of the environmental temperature for use is determined, and an amount of deflection of an optical fiber is obtained at said second ferrule fixing temperature which can suppress or prevent a tensile stress exceeding the allowance from being applied onto the lensed fiber between said first and second ferrules at the upper limit of the environmental temperature for use, wherein after the tip end side of the lensed fiber is inserted into and fixed at said first ferrule and is fixed on the base, deflection equivalent to the amount of deflection is formed on the lensed fiber between said first ferrule and said second ferrule under said second ferrule fixing temperature conditions, and in this state said second ferrule in which any intermediate portion of the lensed fiber is fixed is secured in the package.

* * * * *